United States Patent [19]
Perry

[11] Patent Number: 6,150,771
[45] Date of Patent: *Nov. 21, 2000

[54] CIRCUIT FOR INTERFACING BETWEEN A CONVENTIONAL TRAFFIC SIGNAL CONFLICT MONITOR AND LIGHT EMITTING DIODES REPLACING A CONVENTIONAL INCANDESCENT BULB IN THE SIGNAL

[75] Inventor: Bradford J. Perry, Cumby, Tex.

[73] Assignee: Precision Solar Controls Inc., Garland, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,030

[22] Filed: Jun. 11, 1997

[51] Int. Cl.[7] .................................................. H05B 37/02
[52] U.S. Cl. ...................... 315/291; 315/129; 315/247; 363/74
[58] Field of Search .................................... 315/246, 247, 315/291, 219, 224, 225, 119, 125, 126, 127, 129; 363/89, 124, 74, 125

[56] References Cited

U.S. PATENT DOCUMENTS

| 3,500,455 | 3/1970 | Ross et al. . |
| 3,611,177 | 10/1971 | Helbers . |

(List continued on next page.)

FOREIGN PATENT DOCUMENTS

| 2142132 | 2/1995 | Canada . |
| 0 293 921 | 12/1988 | European Pat. Off. . |
| 0 472 963 A2 | 3/1992 | European Pat. Off. . |
| 0 585 595 A2 | 3/1994 | European Pat. Off. . |
| 0 660 648 A1 | 6/1995 | European Pat. Off. . |
| 0 786 714 | 7/1997 | European Pat. Off. . |
| 3535204 A1 | 4/1986 | Germany . |
| 3644347 A1 | 12/1988 | Germany . |
| 63-178221 | 7/1988 | Japan . |
| 63-231687 | 9/1988 | Japan . |
| 9-143938 | 6/1997 | Japan . |
| 9-204843 | 8/1997 | Japan . |
| 93/04652 | 3/1994 | South Africa . |

OTHER PUBLICATIONS

Goodenough, Frank; "PWM Controller Chip Fixes Power Factor"; Jun. 8, 1989; vol. 37, No. 12, p. 81.
Brown, Marty. *Power Supply Cookbook*. Butterworth–Heinemann, Boston, Mass., 1994, pp. 195–206.
Albach, M. "Conducted Interference Voltage of AC–DC Converters," IEEE, 1986, pp. 203–212.
Guan–Chyun Hsieh et al. "Design of Power Factor Corrector for the Off–Line Isolated Buck/Boost Converter by a Voltage–Follower Technique," IEEE, 1993, pp. 959–964.
de Sa e Silva, Claudio, "Power Factor Correction with the UC3854," Unitrode Integrated Circuits Corp.

(List continued on next page.)

Primary Examiner—David H. Vu
Attorney, Agent, or Firm—Nixon & Vanderhye P.C.

[57] ABSTRACT

A circuit for interfacing between a conventional traffic signal's control monitor and a plurality of light emitting diodes (LEDs) replacing an incandescent lamp of the traffic signal is disclosed. The interface circuit includes a current source for driving the LEDs with a regulated power factor corrected current. Compatibility with traditional conflict monitors is achieved through a circuit that short circuits incoming current to indicate full turn off of the signal and opens up to indicate full turn on of the signal, and through an "OFC" circuit which presents an open circuit to the conflict monitor upon failure of the traffic signal LEDs. Quick turn-off of the traffic signal LEDs is accomplished with a switching circuit that reduces current flowing through the LEDs below the range for visible turn-off. To minimize light reduction in case of LED failure, the traffic signal LEDs are arranged in either multiple strings of LEDs connected in parallel though multiple substring connections between groups of LEDs, or in a single string of LEDs with reverse biased zener diodes connected in parallel with groups of LEDs.

40 Claims, 8 Drawing Sheets

U.S. PATENT DOCUMENTS

| | | |
|---|---|---|
| 3,705,316 | 12/1972 | Burrous et al. . |
| 3,787,152 | 1/1974 | Delay . |
| 3,872,301 | 3/1975 | Joppich . |
| 3,873,905 | 3/1975 | Marek . |
| 3,959,711 | 5/1976 | Greenhalgh . |
| 4,001,637 | 1/1977 | Gray . |
| 4,012,686 | 3/1977 | Heine . |
| 4,037,271 | 7/1977 | Keller . |
| 4,090,189 | 5/1978 | Fisler . |
| 4,109,307 | 8/1978 | Knoll . |
| 4,182,977 | 1/1980 | Stricklin, Jr. . |
| 4,190,836 | 2/1980 | Kimura et al. . |
| 4,211,955 | 7/1980 | Ray . |
| 4,238,707 | 12/1980 | Malissin et al. . |
| 4,247,854 | 1/1981 | Carpenter et al. . |
| 4,298,869 | 11/1981 | Okuno . |
| 4,319,164 | 3/1982 | Tulleners . |
| 4,323,895 | 4/1982 | Coste . |
| 4,329,625 | 5/1982 | Nishizawa et al. . |
| 4,342,947 | 8/1982 | Bloyd . |
| 4,367,464 | 1/1983 | Kurahashi et al. . |
| 4,386,281 | 5/1983 | Terry . |
| 4,388,578 | 6/1983 | Green et al. . |
| 4,495,445 | 1/1985 | Turney . |
| 4,581,655 | 4/1986 | Ide et al. . |
| 4,598,198 | 7/1986 | Fayfield . |
| 4,645,997 | 2/1987 | Whited . |
| 4,656,365 | 4/1987 | Billings . |
| 4,673,865 | 6/1987 | DeLuca et al. . |
| 4,677,366 | 6/1987 | Wilkinson et al. . |
| 4,712,000 | 12/1987 | Yoshikawa et al. . |
| 4,717,868 | 1/1988 | Peterson . |
| 4,719,552 | 1/1988 | Albach et al. . |
| 4,729,076 | 3/1988 | Masami et al. . |
| 4,825,351 | 4/1989 | Uesugi . |
| 4,837,495 | 6/1989 | Zansky . |
| 4,845,489 | 7/1989 | Hormel . |
| 4,849,683 | 7/1989 | Floid . |
| 4,855,890 | 8/1989 | Kammiller . |
| 4,891,569 | 1/1990 | Light . |
| 4,929,871 | 5/1990 | Gerfast . |
| 4,933,605 | 6/1990 | Quazi et al. ............................. 315/224 |
| 4,939,426 | 7/1990 | Menard et al. ......................... 315/192 |
| 4,943,902 | 7/1990 | Severinsky . |
| 4,954,822 | 9/1990 | Borenstein . |
| 4,958,108 | 9/1990 | Jorgensen ............................... 315/307 |
| 4,969,282 | 11/1990 | Eberhart . |
| 4,974,141 | 11/1990 | Severinsky et al. . |
| 4,980,812 | 12/1990 | Johnson, Jr. et al. . |
| 4,988,889 | 1/1991 | Oughton, Jr. . |
| 5,001,620 | 3/1991 | Smith . |
| 5,003,454 | 3/1991 | Bruning . |
| 5,004,947 | 4/1991 | Nilssen . |
| 5,006,975 | 4/1991 | Neufeld . |
| 5,008,599 | 4/1991 | Counts . |
| 5,012,161 | 4/1991 | Borowiec et al. . |
| 5,012,162 | 4/1991 | Chun . |
| 5,019,952 | 5/1991 | Smolenski et al. . |
| 5,023,521 | 6/1991 | Sridharan . |
| 5,030,887 | 7/1991 | Guisinger . |
| 5,041,766 | 8/1991 | Fiene et al. . |
| 5,047,912 | 9/1991 | Pelly . |
| 5,048,033 | 9/1991 | Donahue et al. ........................ 372/38 |
| 5,075,601 | 12/1991 | Hildebrand . |
| 5,095,305 | 3/1992 | Ide et al. . |
| 5,113,337 | 5/1992 | Steigerwald . |
| 5,134,355 | 7/1992 | Hastings . |
| 5,135,160 | 8/1992 | Tasaki . |
| 5,146,398 | 9/1992 | Vila-Masot et al. . |
| 5,212,428 | 5/1993 | Sasaki et al. ........................... 315/308 |
| 5,235,504 | 8/1993 | Sood . |
| 5,258,692 | 11/1993 | Jones . |
| 5,309,062 | 5/1994 | Perkins et al. . |
| 5,313,187 | 5/1994 | Choi et al. . |
| 5,317,307 | 5/1994 | Thomas, Jr. . |
| 5,321,600 | 6/1994 | Fierheller ................................ 363/65 |
| 5,349,172 | 9/1994 | Roustaei . |
| 5,354,977 | 10/1994 | Roustaei . |
| 5,359,274 | 10/1994 | Bandel . |
| 5,359,276 | 10/1994 | Mammano . |
| 5,363,020 | 11/1994 | Chen et al. ........................ 315/209 R |
| 5,367,223 | 11/1994 | Eccher .................................... 315/97 |
| 5,371,667 | 12/1994 | Nakao et al. . |
| 5,391,976 | 2/1995 | Farrington et al. . |
| 5,396,153 | 3/1995 | Shackle . |
| 5,408,403 | 4/1995 | Nerone et al. . |
| 5,420,779 | 5/1995 | Payne ..................................... 363/56 |
| 5,430,635 | 7/1995 | Liu . |
| 5,436,529 | 7/1995 | Bobel .................................... 315/127 |
| 5,436,553 | 7/1995 | Pepper et al. . |
| 5,438,586 | 8/1995 | Ishii et al. . |
| 5,446,440 | 8/1995 | Gleason et al. . |
| 5,449,981 | 9/1995 | Auld et al. ............................. 315/308 |
| 5,459,478 | 10/1995 | Bolger et al. . |
| 5,463,280 | 10/1995 | Johnson . |
| 5,489,771 | 2/1996 | Beach et al. . |
| 5,510,680 | 4/1996 | Nilssen . |
| 5,532,918 | 7/1996 | Mayrand et al. ....................... 363/89 |
| 5,550,463 | 8/1996 | Coveley . |
| 5,563,781 | 10/1996 | Clauter et al. ........................ 363/124 |
| 5,572,112 | 11/1996 | Saeki et al. . |
| 5,572,416 | 11/1996 | Jacobs et al. ........................... 363/89 |
| 5,587,895 | 12/1996 | Harkins .................................. 363/89 |
| 5,614,812 | 3/1997 | Wagoner . |
| 5,615,101 | 3/1997 | Moriarty . |
| 5,633,629 | 5/1997 | Hochstein . |
| 5,635,902 | 6/1997 | Hochstein . |
| 5,638,265 | 6/1997 | Gabor . |
| 5,646,512 | 7/1997 | Beckwith . |
| 5,650,694 | 7/1997 | Jayaraman et al. ................... 315/225 |
| 5,654,705 | 8/1997 | Houten et al. . |
| 5,661,645 | 8/1997 | Hochstein .............................. 363/89 |
| 5,663,719 | 9/1997 | Deese et al. . |
| 5,764,039 | 6/1998 | Choi et al. . |
| 5,765,940 | 6/1998 | Levy et al. . |
| 5,782,555 | 7/1998 | Hochstein . |
| 5,783,909 | 7/1998 | Hochstein . |
| 5,785,418 | 7/1998 | Hochstein . |

OTHER PUBLICATIONS

"Power Factor Controllers," Motorla Analog/Interface ICs Device Data, vol. 1, pp. 3–612, 3–623, 3–632 through 3–635.

"Power Factor Controllers," Motorola Analog IC Device Data, pp. 3–439 through 3–449.

Unitrode Integrated Circuits Corp. Product & Applications Handbook, 1993–94, pp. 5–213 through 5–217.

Unitrode Integrated Circuits Corp. Product & Applications Handbook, 1995–96, pp. 6–278 through 6–286.

Unitrode Integrated Circuits Corp., *High Power Factor Preregulator*, Feb. 1993, pp. 5–218 through 5–225.

Unitrode Integrated Circuits Corp., *High Power Factor Preregulator*, Oct. 1994, pp. 6–287 through 6–294.

Unitrode Integrated Circuits Corp., *Enhanced High Power Factor Preregulator*, Jan. 1995, pp. 6–296 through 6–300.

Unitrode Integrated Corp., *High Performance Power Factor Preregulator*, Nov. 1994, pp. 6–301 through 6–306.

Unitrode Integrated Circuits Corp., *Improved Current Mode PWM Controller*, Nov. 1994, pp. 6–307 through 6–314.

Micro Linear, *Flyback Power Factor Controller*, May, 1997, pp. 8–43 through 8–53.

D.C. Thomas, Jr., et al., IBM Technical Disclosure Bulletin, *Digital Feedback Light–Emitting Diode Control*, Jan. 1974, vol. 16, No. 8, pp. 2598–2601.

"Power Factor Controller," *Electronics World—Wireless World*, Applications, Dec. 1993, pp. 1034–1035.

"Sense Resistors: Theory and Characteristics," Excerpt from Course on Current Sensing for Power Conversion and Motion System Applications Sponsored by PCIM Magazine, Sep. 1997.

Notation of Electrical Circuit Theorems from BOWest Pty. Ltd. Web Site Library.

Dugan, Roger C. et al., *Electrical Power Systems Quality*, McGraw–Hill, 1996, pp. 124–133, 170–171.

Andreycak, Bill, "Power Factor Correction Using the UC3852 Controlled On–Time Zero Current Switching Technique," Unitrode Application Note, pp. 3–235—3–250.

Unitrode Data Sheets for UC1852, UC2852 and UC3852, pp. 5–3—5–7.

Irwin, J. David, *Basic Engineering Circuit Analysis*, $3^{rd}$ ed., Macmillan Publishing Company, 1989, pp. 462–467, 470–472.

Horowitz, Paul and Winfield Hill, *The Art of Electronics*, $2^{nd}$ ed., Cambridge University Press, 1989, pp. 140–145, 379.

"Safety First—A Purchasing Guide to Traffic Signal Lamps," Traffic Technology International, 1997, Henri Arcand, ECOLUX, Inc., Canada.

"Dialight 432 Series Temperature Compensated Light Emitting Diode (LED) Traffic Signals,"Dialight Corporation, Rev. Jul. 1998, 4 pages.

Relume's Memorandum of Points and Authorites in Support of its Motion for a Preliminary Injunction dated Oct. 26, 1998, *Relume Corporation v. Dialight Corporation et al.*, Case No. 98–72360.

Declaration of Peter Hochstein dated Oct. 23, 1998, submitted in support of Relume's Motion for a Preliminary Injunction, *Relume Corporation v. Dialight Corporation et al.*, Case No. 98–72360.

Brief in Support of the Joint Opposition of Defendants Dialight Corporation . . . to Plaintiff Relume's Motion for a Preliminary Injunction dated Nov. 18, 1998, *Relume's Corporation v. Dialight Corporation et al.*, Case No. 98–CV–72360.

Declaration of Robert W. Erickson dated Nov. 17, 1998, submitted in support of the Joint Opposition of Defendants Dialight Corporation . . . to Plaintiff Relume's Motion for a Preliminary Injunction, *Relume Corporation v. Dialight Corporation et al.*, Case No. 98–72360.

Declaration of Bradford J. Perry dated Nov. 16, 1998, submitted in support of the Joint Opposition of Defendants Dialight Corporation . . . to Plaintiff Relume's Motion for a Preliminary Injunction, *Relume Corporation v. Dialight Corporation et al.*, Case No. 98–72360.

Exhibit 1 to the Declaration of Bradford J. Perry dates Nov. 16, 1998, *Relume Corporation v. Dialight Corporation et al.*, Case No., 98–72360.

Relume's Response to Precision Solar Controls, Inc.'s First Set of Interrogatories, *Relume Corporation v. Dialight Corporation et al.*, Case No. 98–72360.

Relume's Reply Brief in Support of its Motion for a Preliminary Injunction dated Dec. 2, 1998, *Relume Corporation v. Dialight Corporation et al.*, Case No. 98–72360.

Declaration of Peter Hochstein dated Dec. 1, 1998, submitted in support of Relume's Reply Brief in Support of its Motion for a Preliminary Injunction, *Relume Corporation v. Dialight Corporation et al.*, 98–72360.

Brief in Support of Defendant Precision Solar Control Inc.'s Motion for Summary Judgment of Non–Infringement of U.S. Patent No. 5,661,645 dated Apr. 26, 1999, *Relume Corporation v. Dialight Corporation et al.*, Case No. 98–CV–72360.

Declaration of Alex J. Severinsky, Ph.D., P.E. dated Apr. 24, 1999, submitted in support of Precision Solar Controls, Inc.'s Motion for Summary Judgment of Non–Infringement of U.S. Patent No. 5,661, 645, *Relume Corporation v. Dialight Corporation et al.*, Case No. 98–72360.

Exhibits 4 and 6 to the Declaration of Alex J. Severinsky, Ph.D., P.E. dated Apr. 24, 1999, *Relume Corporation v. Dialight Corporation et al.*, Case No. 98–72360.

Relume's Consolidated Opposition to: Precision Solar Controls, Inc's Motion for Summary Judgment of Non–Infringement of U.S. Patent No. 5,661,645 . . . dated May 10, 1999, *Relume Corporation v. Dialight Corporation et al.*, Case No. 98–72360.

Declaration of Thomas A. Gafford in Support of Relume's Opposition to Defendant Motions for Summary Judgement of Noninfringement dated May 10, 1999, *Relume Corporation v. Dialight Corporation et al.*, Case No. 98–72360.

Reply of Defendants Precision Solar Controls, Inc. in Support of its Motion for Summary Judgement of Non–Infringement of U.S. Patent No. 5, 661, 645 dated May 20, 1999, *Relume Corporation v. Dialight Corporation et al.*, Case No. 98–CV–72360.

Rule 26(a)(2)(B) and (C) Expert Witness Report of Thomas Austin Gafford dated Apr. 28, 1999, *Relume Corporation v. Dialight Corporation et al.*, Case No. 98–72360.

Initial Expert Report of Alex J. Severinsky, Ph. D., P.E. dated Apr. 27, 1999, *Relume Corporation v. Dialight Corporation et al.*, Case No. 98–CV–72360.

Opinion and Order dated Aug. 26, 1999, *Relume Corporation v. Dialight Corporation et al.*, Case No. 98–CV–72360.

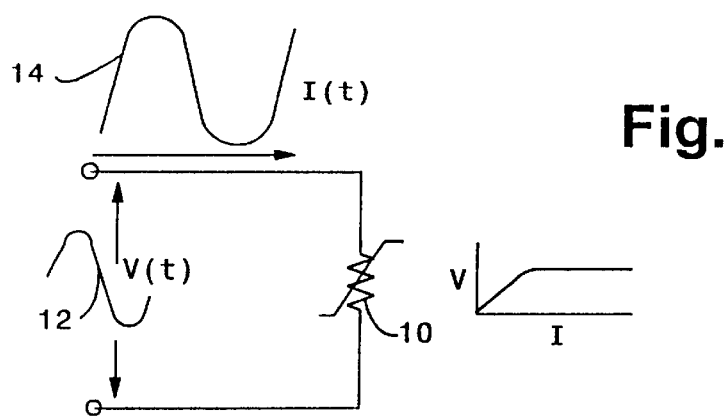
Fig. 1
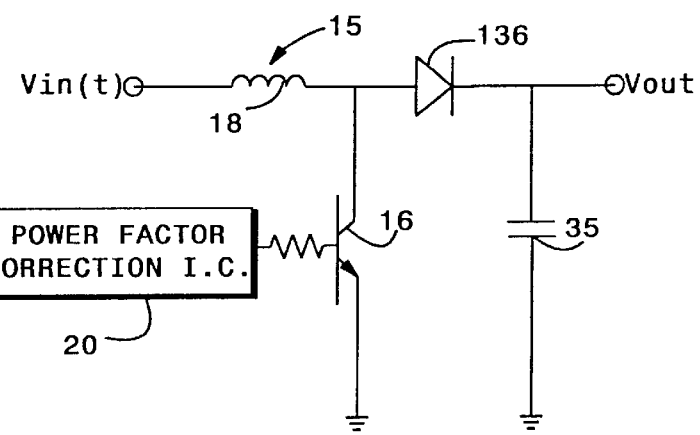
Fig. 2
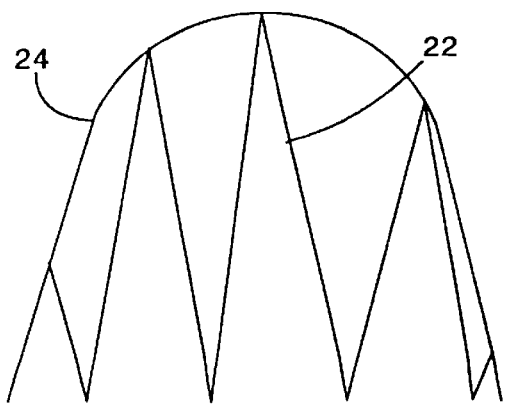
Fig. 3

Fig. 7
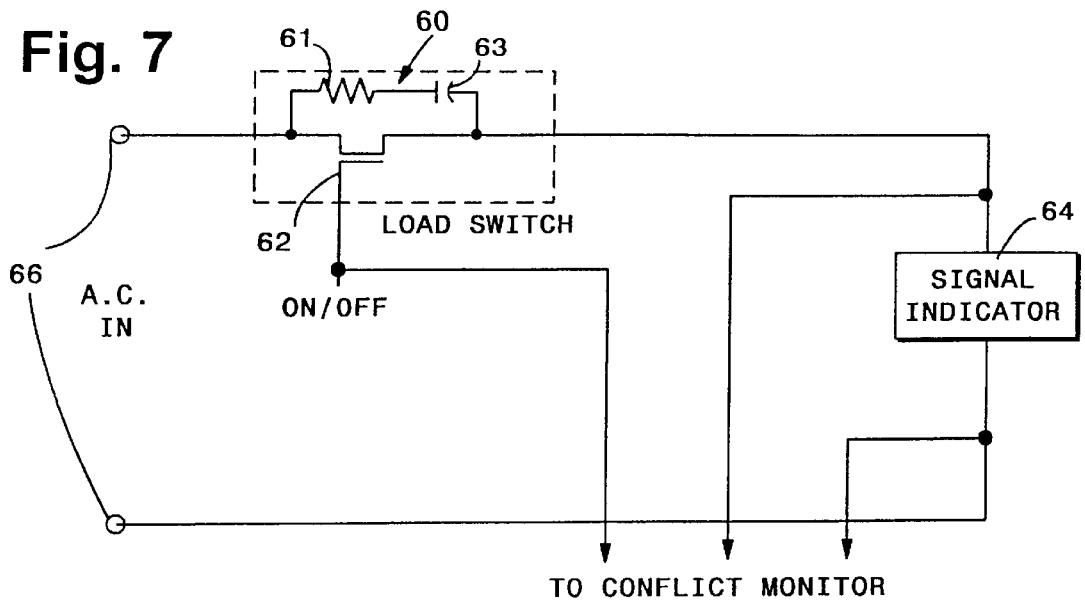
Fig. 9
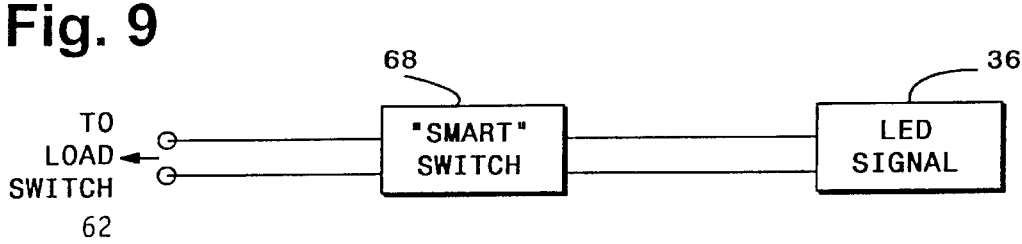
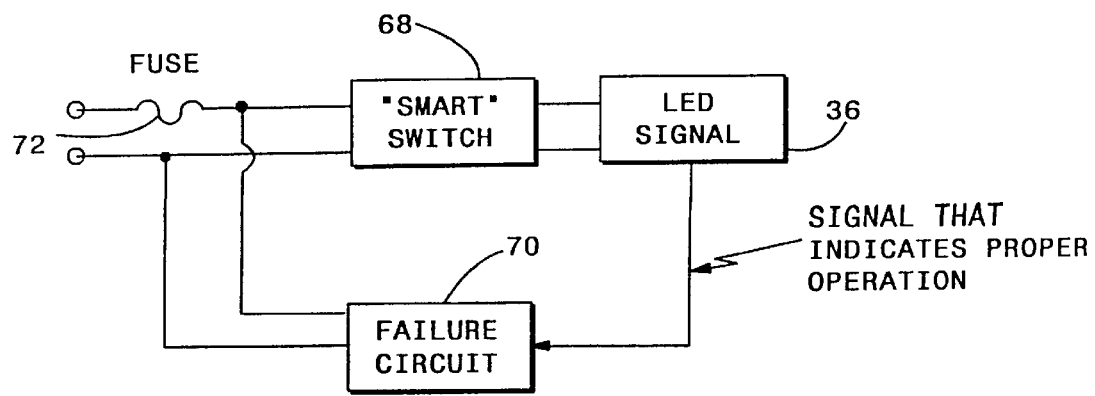
Fig. 10

CIRCUIT FOR INTERFACING BETWEEN A CONVENTIONAL TRAFFIC SIGNAL CONFLICT MONITOR AND LIGHT EMITTING DIODES REPLACING A CONVENTIONAL INCANDESCENT BULB IN THE SIGNAL

BACKGROUND OF THE INVENTION (1) Field of the Invention

The present invention relates to light emitting diode ("LED") traffic signals, and more particularly, to a circuit for interfacing between the load switches and associated conflict monitors used in traditional traffic controllers and the LEDs used in such signals.

(2) Background Information

Traditionally, traffic signals have used incandescent lamps to generate the light signals used to control traffic. One problem with incandescent traffic signals is the high maintenance costs associated with replacing the incandescent lamps that have a much shorter life cycle than the LEDs.

An alternative to incandescent traffic signals are traffic signals which use light emitting diodes (LEDs). Although LED traffic signals are very reliable in comparison to traditional incandescent traffic signals, the use of LED's in traffic signals raises other problems which must be solved.

One problem with LED traffic signals is the type of electrical load they present to utility companies' A.C. power lines. The manner in which electrical devices use current is of great interest to utility companies because of the impact such devices can have on their ability to efficiently deliver energy to customers. Such use is often of interest to customers as well, since commercial customers can receive reductions in their electric bills in the form of Demand Side Rebates when they provide the type of electrical load a utility company considers to be desirable.

A traditional incandescent traffic signal is a desirable type of electrical load because it is inherently a resistive load that uses current linearly, and as such, allows a smooth transfer of power from the incoming line to the traffic signal load.

In contrast, an LED traffic signal typically includes a power supply for the arrays of LEDs that replace the individual incandescent lamps in traditional traffic signals. The rectified and filtered front end of such a power supply uses current in a manner that is very different from resistive loads and, thus, undesirable to utility companies.

Another concern with traffic signals that use LEDs is the output intensity of the LED arrays that replace the incandescent lamps. LEDs are inherently current mode devices. The light output of an LED is linearly related to the current passing through it, albeit with some heating effects at higher currents. As such, it is important that the LEDs be powered by a well regulated current source, since the degree of regulation directly affects the consistency of output intensity of the lamp as a whole.

Turn-off of the LED arrays can also be a significant problem in LED traffic signals because of the extremely small amount of current required to produce a noticeable glow in LEDs, particularly at night.

A further concern that arises out of the use of LEDs in traffic signals is the need to verify that two signal lights are not on at the same time. LED arrays replacing older incandescent lamps must be compatible with the older incandescent load switch technology and its associated conflict monitors. A conventional monitor, which senses voltage across a load, such as an incandescent lamp, has preset thresholds to determine whether or not the signal light is really on or off. These monitors were designed to operate with incandescent lamps, which have essentially constant input impedance once up to operating temperature (this is exactly what defines an incandescent signal as being a resistive load). In contrast, the power supplies and LEDs in newer traffic signals have more of a "step" turn-on characteristic, which leads to a high input impedance when not fully turned on. Without modification, LED signals look to the conventional conflict monitors as if they never turned off, falsely indicating a load switch failure.

An additional concern regarding conflict monitor compatibility is the failed state of any traffic signal. Traditional monitors sense voltage across a signal, and, as such, are only useful with incandescent signals, unless specific modifications are made to other types of signals. Unless specifically designed to accommodate this situation, an LED type signal would not satisfy the compatibility requirement, since the conflict monitor would not sense the failure of the LED signal.

Another concern in LED traffic signals is the circuit arrangement of the LEDs which replace the traditional incandescent lamps. Whether the LEDs are connected in parallel or series, provision must be made to minimize the loss of light output due to any individual catastrophic LED failures.

SUMMARY OF THE INVENTION

Accordingly, it is an object of the present invention to provide an LED traffic signal which presents the type of electrical load that is desirable to utility companies.

It is also an object of the present invention to provide an LED traffic signal in which the LEDs are powered by a regulated current source that maximizes the consistency of output intensity of the traffic signal as a whole.

Another object of the present invention is to provide an LED traffic signal which sufficiently turns off LED arrays so as to eliminate any undesirable glow of LEDs due to residual current flow through the LEDs.

A further object of the present invention is to provide an LED traffic signal which is compatible with conventional incandescent conflict monitors that verify that two signal lights in the traffic signal are not on at the same time, or that a catastrophic failure might have occurred.

Yet another object of the present invention is to arrange the replacement LEDs in a manner that will minimize a reduction in light output in case of a catastrophic LED failure.

The present invention is directed to a circuit for interfacing between a conventional traffic signal's control circuitry and a plurality of light emitting diodes (LEDs) replacing one or more incandescent lamps of the traffic signal. The interface circuit uses a power factor corrected current source for driving the LEDs. The current source switches an input current so that input current has an envelope that is substantially the same as the input voltage. The current source is also regulated by a feedback current so as to control the LEDs' light intensity.

The LED traffic signal interface circuit of the present invention achieves compatibility with the conflict monitors used in conventional traffic signals through the use of a circuit that short circuits incoming current that is below a certain value, indicating signal light turn off, and that opens up when the incoming current exceeds this value, indicating signal light turn on. The interface circuit also includes an "OFC" circuit for indicating an open circuit condition to the conflict monitor when the input voltage is high and the feedback current drops by a certain amount. When this happens the OFC terminates signal operation and presents such a condition to the conflict monitor as a failed incandescent signal. Together, these two sub-circuits allow the conflict monitor to detect a failed load switch or a failed signal, as the monitor was designed to do with incandescent traffic signals.

LED turn-off in the present LED traffic signal is accomplished through a switch that reduces the current flowing through the LEDs below the range for visible turn-off. A diode rectifies a portion of the current used to drive the switch as a logic indicator of "on" or "off".

The LEDs in the present traffic signal are arranged in larger diameter traffic signals in multiple strings of LEDs connected in parallel to accommodate the high voltage output of the boost converter used for power factor correction. The multiple strings of LEDs are, in turn, connected by multiple substring connections to minimize a reduction in light output in the case of an LED failure. For smaller diameter traffic signals, the LED's are arranged in a single series string to realize a high enough voltage for the power factor correction boost converter. A plurality of reverse biased zener diodes are then connected in parallel with groups of LEDs to minimize a reduction in light output in case of LED failure.

BRIEF DESCRIPTION OF THE DRAWINGS

FIG. 1 is an example of harmonic distortion caused by a nonlinear electrical load;

FIG. 2 is a switching circuit used in power factor correction;

FIG. 3 shows a high frequency switching current waveform and switch state waveform for an inductor switching circuit used in power factor correction;

FIG. 7 is a block diagram showing the interconnection in a traditional traffic signal to a conventional conflict monitor.

FIG. 9 is a block diagram showing the interconnections between the switching circuit, load switch and LED signals.

FIG. 10 is a block diagram similar to that shown in FIG. 9, but with the addition of a failure circuit.

DESCRIPTION OF THE PREFERRED EMBODIMENTS

Figure 4:
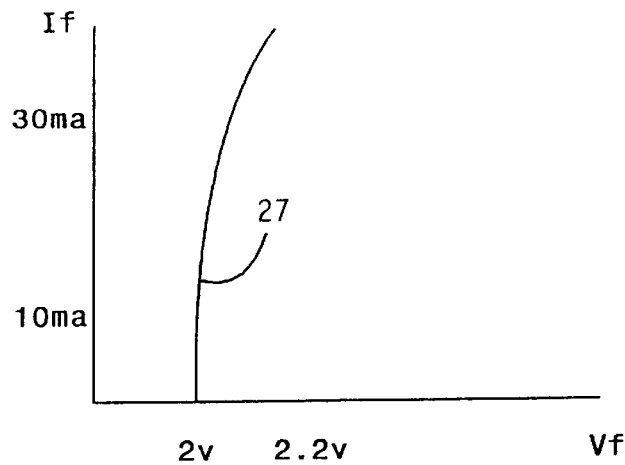
FIG. 4 shows a typical light emitting diode characteristic.

Power Factor is an indication of the reactive (non-resistive) content of a particular load, ignoring harmonic considerations. A pure resistive load uses current linearly, and, therefore, induces no changes onto an incoming A.C. power line except a smooth transfer of power. As such, utility companies seek to minimize non-resistive loads which can impact on a utility company's ability to efficiently deliver power.

The term "Power Factor Correction" implies all of the steps necessary to make an electrical load look resistive when looking at it from an incoming A.C. power line.

Three standard quantities associated with power are:

Apparent power, S—the product of RMS voltage and RMS current;

Active Power, P—which is the average rate of delivery of energy; and

Reactive power, Q—the portion of apparent power that is in quadrature with active power.

These quantities, are related as follows:

$$P = S \cos(\theta) \quad (1)$$

$$Q = S \sin(\theta) \quad (2)$$

Where $\theta$ is the phase angle between the voltage and the current. The factor "$\cos(\theta)$" is called the "Displacement Power Factor" and is equal to the ratio of the of "real power delivered" to "apparent power delivered" in a fundamental frequency only situation. The portion of the apparent power that is not actively delivered to a load, i.e., the reactive portion, is indicative of additional current flowing in power lines and producing $I^2R$ losses (power dissipation). The displacement power factor can be improved (brought closer to unity) with the addition of A.C. line side reactive components.

Harmonic distortion is caused by nonlinear loads, i.e., loads which do not use current proportional to applied voltage.

Referring now to the drawings wherein like reference numerals indicate like elements, and, in particular, to FIG. 1, any load 10 which is not purely resistive will, when a sinusoidal voltage 12 is applied to it, induce some amount of harmonic distortion in the form of a non-sinusoidal current wave form 14.

Any periodic wave form can be expressed as a sum of sinusoids of varying frequency and amplitude, i.e., as a Fourier Series:

$$f(t) = a_0 + \Sigma D_n \cos(n\omega_0 t + \theta_n) \quad (3)$$

or, expressed differently, $$f(t) = a_0 + D_1 \cos(\omega_0 t + \theta_n) + D_2 \cos(2\omega_0 t + \theta_n) + \ldots \quad (4)$$

The frequencies, of these sinusoids are integer multiples (i.e., harmonics) of the fundamental frequency (in this case, 60 hz). Each harmonic has an amplitude dictated by the factor $D_n$ and a phase offset given by $\theta_n$. This can be further simplified in the case where the positive and negative cycle shapes are identical, in that only odd harmonics are produced. This is the case for most harmonic producing devices (halfwave rectifiers being a notable exception).

When considering power factor in the presence of distortion, another quantity is useful:

Distortion power, D—Cross products of voltage and current at different frequencies, which yield no average power.

P, S, Q and D are related as follows:

$$S = (P^2 + Q^2 + D^2)^{1/2} \quad (5)$$

In the presence of harmonics, the previous definition of power factor being the ratio of real power delivered to apparent power delivered includes distortion power and becomes the True Power Factor. In this environment, the use of displacement power factor only would give a false picture. The addition of reactive components designed to improve displacement power factor would do little to improve the true power factor, and may, in fact, do harm through resonance.

Harmonic distortion results in an additional net current flowing in the system (power lines) with an associated $I^2R$ loss with no real power delivered to the load.

As mentioned earlier, displacement power factor correction can be accomplished by adding capacitance or inductance on the A.C. line side of a device to counteract the device's own reactive content. This is frequently done on a plantwide basis to correct for an inductive load (e.g., motors). Loads that draw current in a non-sinusoidal manner frequently have a large third harmonic content (180 hz) but may have a near perfect displacement power factor. This harmonic is additive on three phase neutral lines, while the fundamental is not. This can easily lead to an overload if not protected in the case of a large harmonic producing load (office building with lots of computers, etc.). Correction schemes that solve harmonic problems inherently solve displacement problems.

A common method of true power factor correction uses a switching boost converter circuit. The boost converter circuit switches an inductor to create output voltages that are higher than the input voltages. In an open loop boost converter, the switch operates at a fixed frequency yielding an unregulated fixed output. In a closed loop arrangement, regulation is accomplished by feeding a variable indicative of the output back to the switch through the control loop to modulate duty cycle, thereby enabling regulation. Power factor correction takes place when an error signal which is the resultant of a comparison between input voltage and current is fed back to the switch to modulate duty cycle or frequency.

The present invention uses a power factor correction technique called "Zero Current Switched Boost". Referring to FIG. 2, as in a basic boost converter, an output derived error signal controls the duty cycle of a transistor switch 16 which switches an inductor 18. In the present invention, the feedback loop also includes a power factor correction integrated circuit ("I.C.") 20, that is capable of detecting a zero current crossing and that triggers the next pulse to the switch 16 when it does. The frequency response of this control loop crosses 0 db well below the fundamental frequency of interest (i.e., 60 hz) so that, for a least one input line half cycle, the on-time of switch 16 can be considered essentially constant. This arrangement leads to a variable switch duty cycle to control voltage output and a variable frequency to control current input (i.e., power factor).

The current/voltage relationship of inductor 18 is given by:

$$V = L(dI/dt) \tag{6}$$

Since the current through inductor 18 starts from zero for each pulse period, as forced by the zero current switching technique, and the time interval can be considered constant throughout the line half cycle, then:

$$dI/dt = I_{peak}/\text{constant} \tag{7}$$

The value of inductor 18 is constant also, simplifying equation (6) to:

$$V = \text{constant}(I_{peak}/\text{constant}) \tag{8}$$

or, $$I_{peak}(t) \, V(t) \tag{9}$$

Equation (9) predicts that the peak current will track exactly the instantaneous voltage, precisely what is needed for power factor correction. As shown in FIG. 3, the result is a high frequency switching current wave form 22 whose envelope is the same as the voltage wave form 24. The state of switch 16 is also shown in FIG. 3 through switching waveform 26. It has been found that use of the Zero Current Switched Boost technique described above can result in a power factor greater than 0.99 in LED traffic signals.

The LEDs replacing the traditional incandescent lamps in traffic signals are inherently current mode devices. A typical voltage/current ("V-I") characteristic 27 for an LED is shown in FIG. 4. The light output of an LED is linearly related to the current passing through it, with some heating effects at higher currents. Thus, a main requirement for an LED based traffic signal is a well regulated current source, since the degree of regulation directly affects the output intensity of the traffic signal as a whole.

Figure 5:
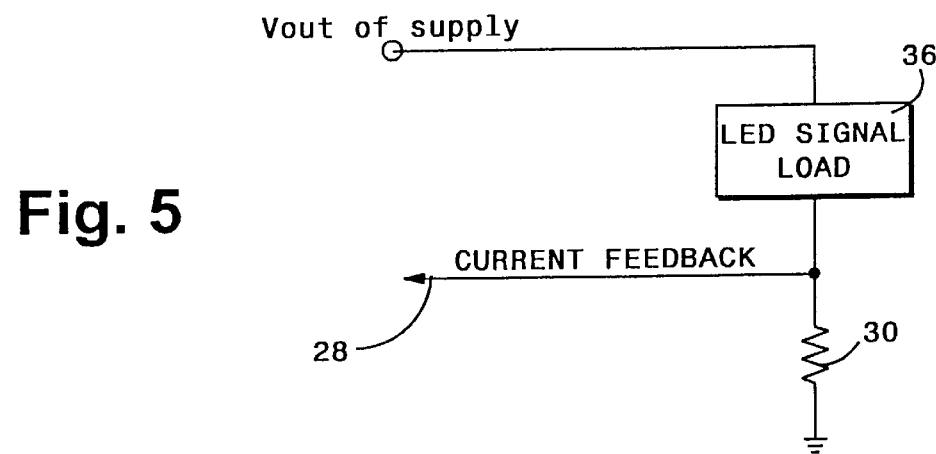
FIG. 5 shows a circuit for developing a current feedback used in providing a regulated current source for the traffic signal LEDs.

In the present invention, the power factor corrected current source uses a current output feedback variable rather than voltage, as in most power factor correction boost converters. As shown in FIG. 5, this current feedback is accomplished by feeding the voltage 28 developed across a small return line current sense resistor 30 back to the control I.C. 20 (shown in FIGS. 2 and 11B) used in power factor correction. This feedback arrangement, in conjunction with the control spread (maximum duty cycle variation) of the control I.C., achieves a regulated current source across desired input line and LED load variations (the load variation being the change in the LEDs' forward voltage with temperature). The measure of intensity regulation is directly related to the gain in the output regulation feedback loop.

Figure 6:
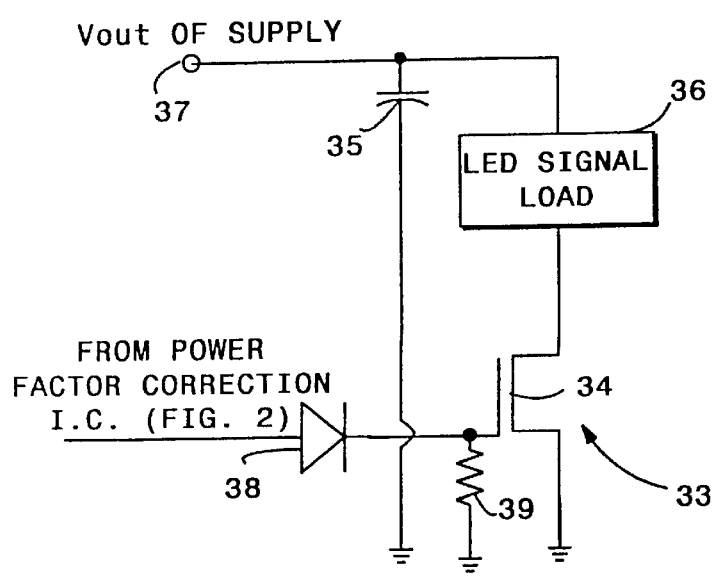
FIG. 6 shows a switching circuit for turning off LEDs in which current to the switch is rectified.

LED turn-off is another concern in LED traffic signals because of the extremely small current required to produce a noticeable glow in LEDs, especially at night. For example, referring to FIG. 6, an output filter capacitor 35 can be a reservoir of energy that continues to power the LED load 36 after power 37 is removed. Due to the LEDs' V-I characteristic, the current through the LEDs 36 falls very quickly at first, but then tails off over a long period. As shown in FIG. 6, in the present invention, a transistor switch 34 reduces the current flowing through the LED load 36 below the picoamp range for visible turn-off. This is accomplished by using a diode 38 to rectify a portion of the current driving switching transistor 34 as a logic indicator of "on" or "off".

Since the LEDs in a traffic signal often replace older incandescent lamps, they have to be compatible with the older incandescent drive technology and their associated conflict monitors that verify that two signal lights are not on at the same time. A conventional incandescent monitor senses voltage across the signal load and has preset thresholds to determine whether or not the signal is really on or off. An incandescent light has an essentially constant input impedance once up to operating temperature, whereas switching power supplies (and LEDs) have more of a "step" turn on characteristic, which leads to high input impedance's when not fully turned on. Without modification, the LED signal appears to the conflict monitor as having never turned off.

As shown in FIG. 7, in a traditional traffic signal arrangement, a passive "snubber" circuit 60 in a solid state signal load switch 62 keeps the switch off state source impedance to around 30 k ohms instead of the hundreds of megohms of the open (off) switch itself. If the source impedance of 30 k ohms is much less than the signal load 64 input impedance, almost the full line voltage 66 will be impressed across the inactive signal 64, telling the conflict monitor (not shown) that it is still on, while, in fact, it is not. The input impedance of a traditional incandescent signal is in the range of 100 ohms, low enough to keep the majority of line voltage impressed across the snubber and not the signal.

Figure 8:
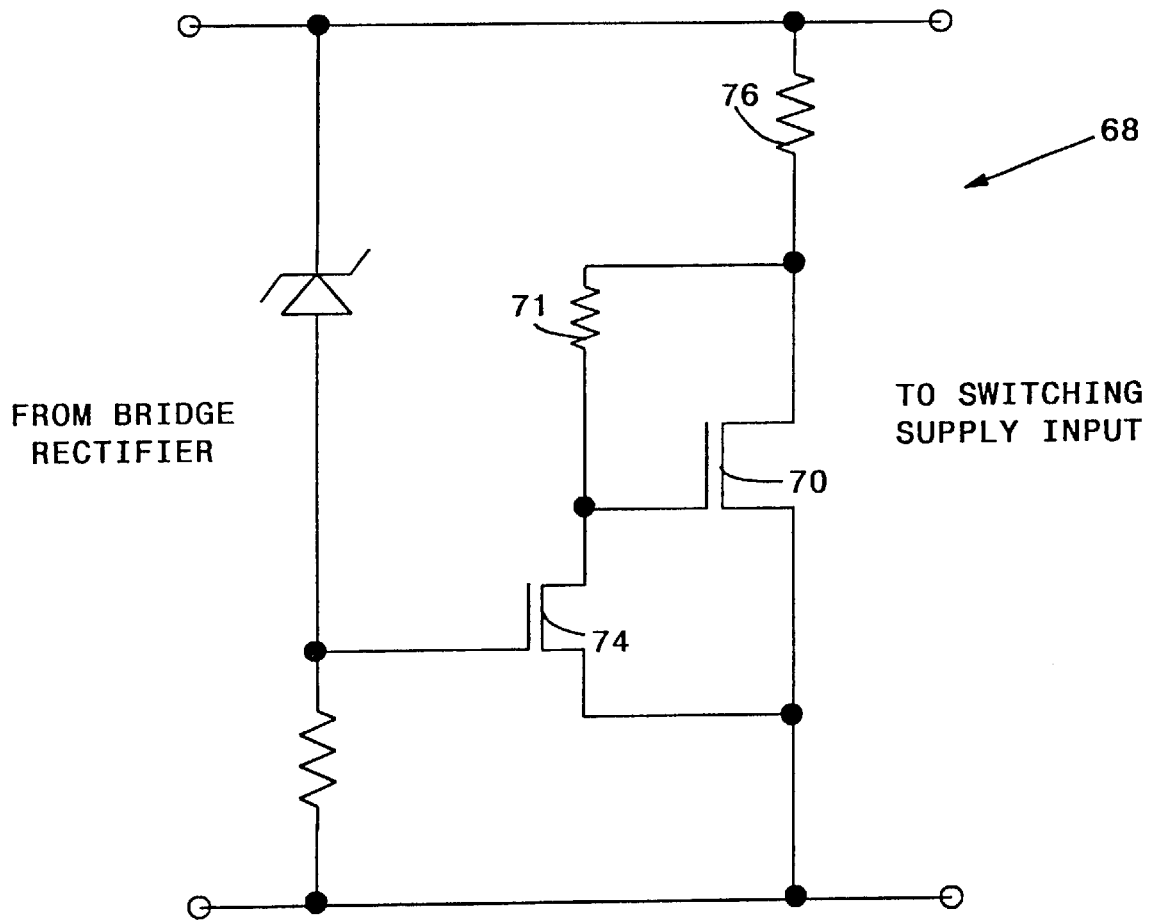
FIG. 8 shows a "switching circuit" circuit for telling a conventional conflict monitor that an LED signal is on or off.

To deal with the large input impedance of new LED signals, the present invention uses a switching circuit shown in FIG. 8. This switch either short circuits incoming current below a certain value to indicate full signal light turn off, or opens up when current exceeds this value to indicate full signal light turn on. Referring to FIG. 8, in the switching circuit, generally shown as 68, the gate of transistor 70 is biased up via resistor 71 to keep in it the "on" state for small currents (signal off). The gate of transistor 74 is brought positive when the current passing through transistor 70 and resistor 76 exceeds a predetermined value (signal on). This turns on transistor 74 which pulls the gate of transistor 70 down to ground, turning transistor 70 off and effectively removing the switching circuit from the rest of the interface circuit.

In the traditional signal arrangement, when the load switch 62 is off, a small leakage current still flows in snubber circuit 60, which includes resistor 61 and capacitor 63. If signal load 64 has a high input impedance in the off state, the voltage across it will float high, telling the conflict monitor that either the load switch 62 has failed shut or the normally low impedance of an incandescent bulb has risen (indicating a burned out bulb).

Referring to FIGS. 7 and 9, in the present LED signal, when the load switch 62 is off, the switching circuit 68 sees the high impedance source of the snubber 60 and shorts the limited input all current passing through it, which presents a low voltage to the conflict monitor to tell the monitor that the signal is off. When the load switch 62 is on, the switching circuit 68 tries to short circuit current on a cycle by cycle basis, but when the input current reaches a predetermined threshold, it ceases this effort to then allow LED signal operation to indicate to the conflict monitor that the signal is on.

If the LED signal fails, the switching circuit 68 will continue its operation and the conflict monitor will never see the failure. In this situation, a failure circuit 70, shown in FIG. 10, senses the drop in output current due to the LED signal failure. If the output current drops by at least 50% for several seconds, the failure circuit 70 shorts a fuse 72. The blown fuse 72 then permanently indicates to the conflict monitor a failed signal, i.e., infinite input impedance.

Figure 11A:
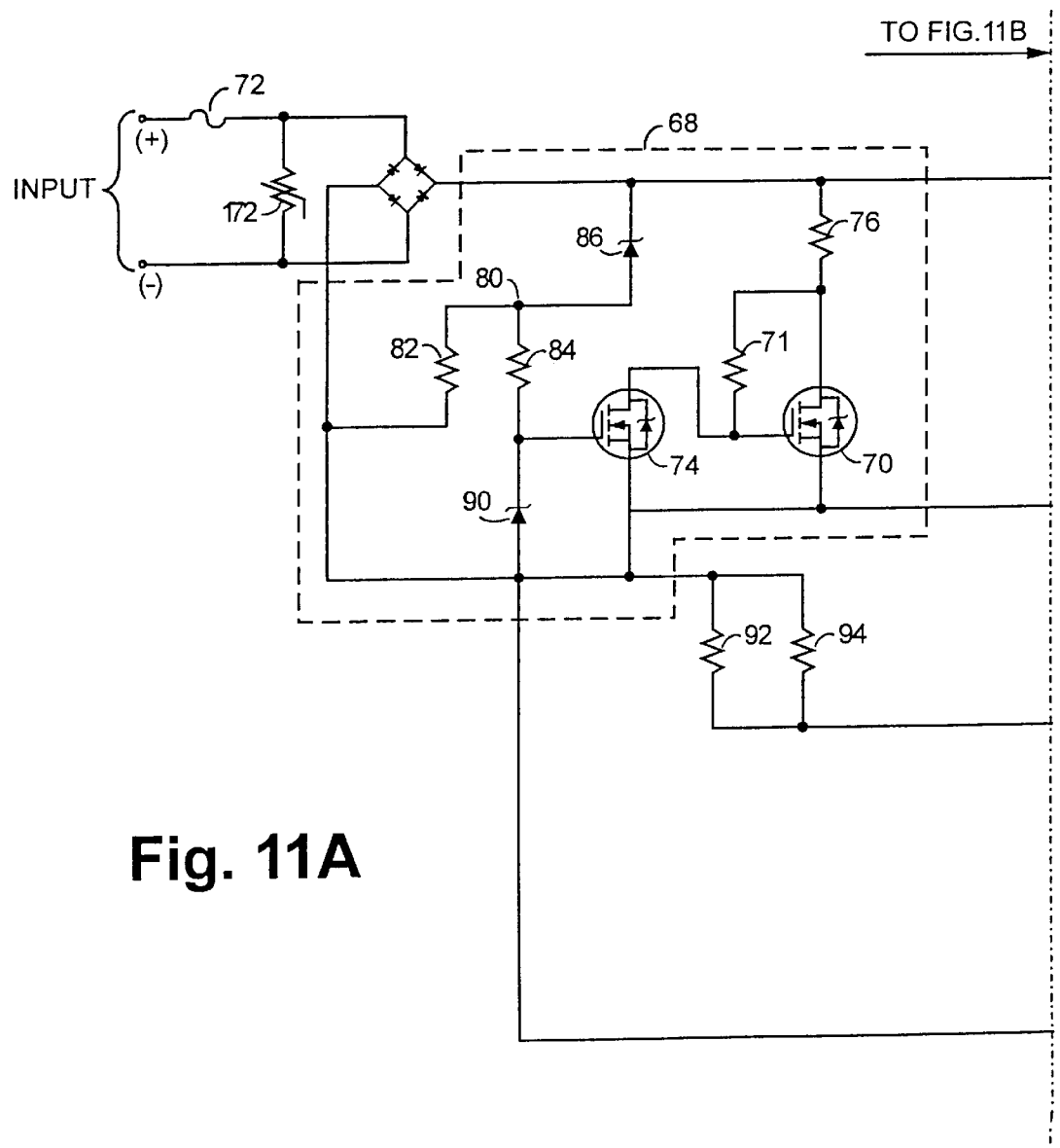
FIGS. 11A–C show a schematic of the preferred embodiment of the Interface Circuit of the present invention.
Figure 11B:
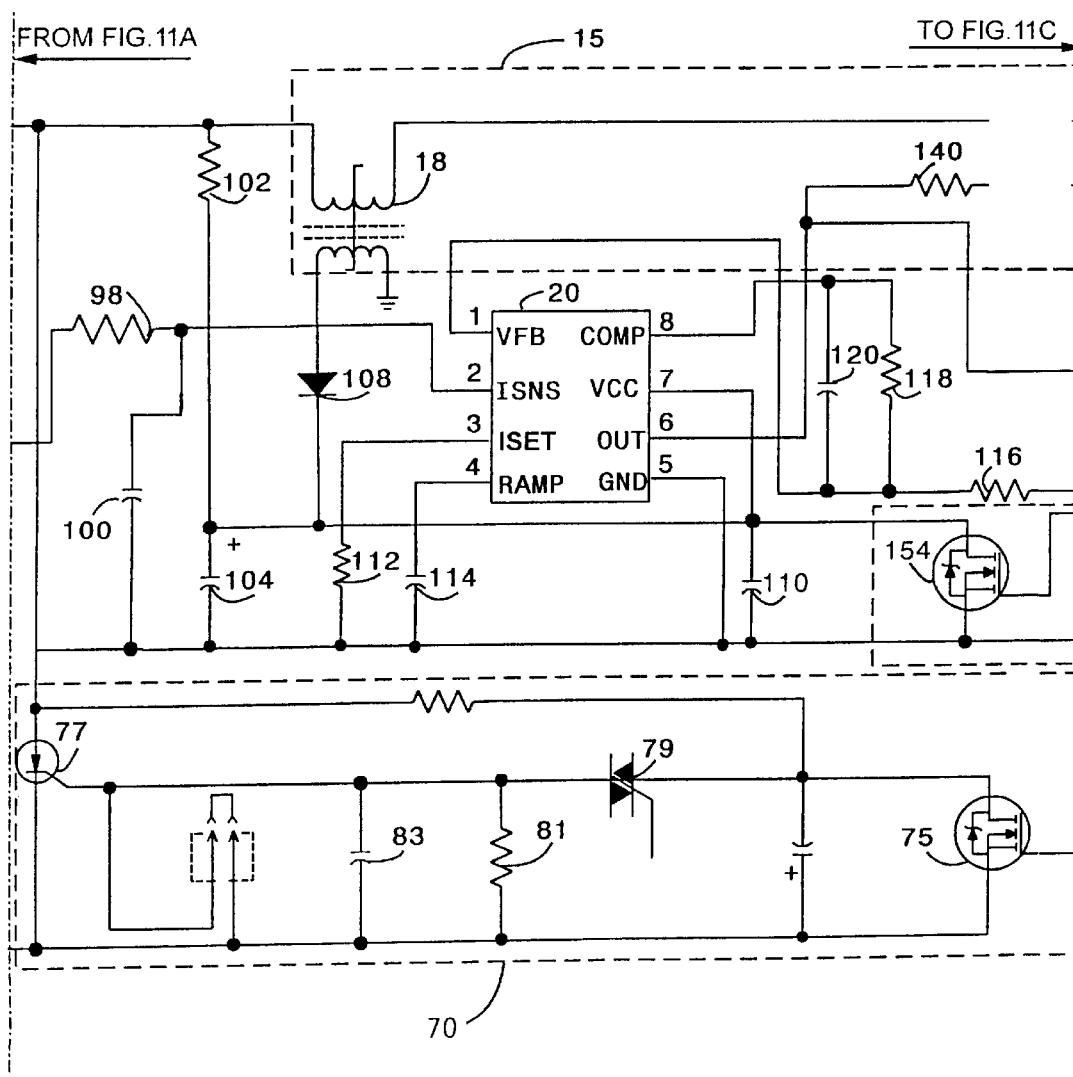
Figure 11C:
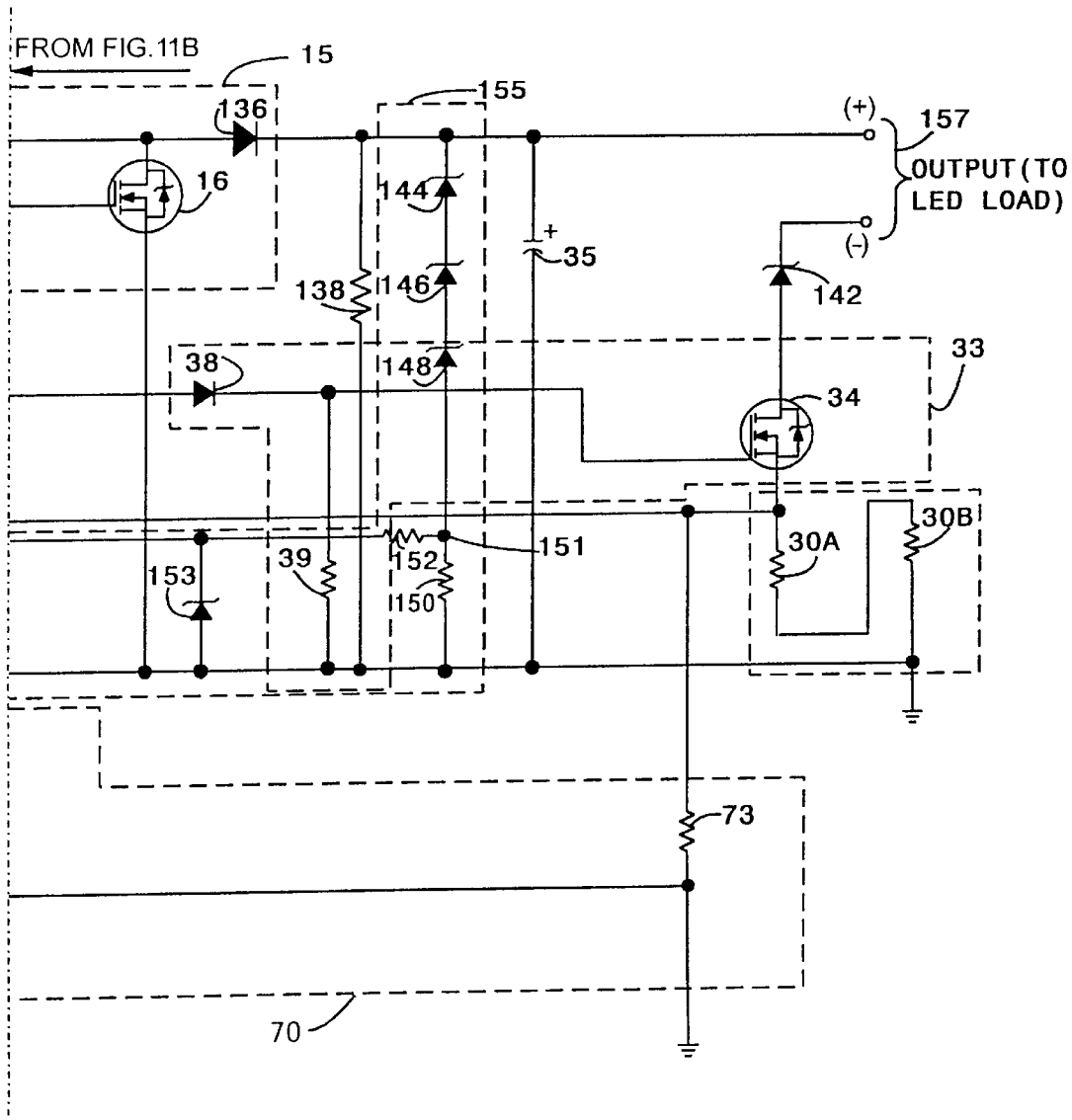

FIGS. 11A, 11B and 11C are together a detailed schematic of the interface circuit used in the present invention. Each of the circuits generally discussed above are shown in greater detail in FIG. 11A.

The conflict monitor switching circuit generally discussed above is shown by dashed lines 68 in FIG. 11A. When this circuit is presented with a high source impedance, transistor 70 is biased on via resistor 71 performing the necessary shunting action. When the circuit is presented with a low source impedance, transistor 70 continues its shunting action until the voltage drop across current carrying resistor 76 exceeds approximately 10 volts. Once this threshold is reached, the node 80 between resistors 82 and 84 and the anode of zener diode 86 rises above ground since the zener voltage of diode 86 has been exceeded, and the remainder of this voltage is then presented across resistor 82. This voltage is delivered via resistor 84 to transistor 74 whose function is to pull the gate of transistor 70 to ground, thereby ending transistor 70's shunting action and allowing normal circuit operation. Zener diode 90 clamps the gate of transistor 74 to no more than 10 volts through the compliance of resistor 84, as zener diode 86's anode swings to within 30 volts of full input line voltage.

If the LED signal fails, the switching circuit 68 will continue its operation and the conflict monitor will never see the failure. In this situation, the failure circuit 70 discussed above with respect to FIG. 10, and shown in greater detail in FIGS. 11A–11C by dashed lines 70, comes into operation. This failure circuit is also called an "OFC" circuit because it mimics an open filament condition. When it senses a drop in output current due to the LED signal failure, it indicates an open circuit to the conflict monitor, just as an open incandescent lamp would. In operation, when the current through resistor 73 (FIG. 11C) drops by an average of 50% for several seconds, transistor 75 (FIG. 11B) is turned off, causing SCR 77 through silicon bilateral switch 79 to latch and permanently blow fuse 72 (FIG. 11A). Resistor 81 reduces the sensitivity of the gate of SCR 77, while capacitor 83 increases the noise immunity of such gate. The drop in output current could be triggered by power supply failure or catastrophic LED failure. The blown fuse 72 then permanently indicates to the conflict monitor a failed signal, analogous to a burned out incandescent lamp.

The heart of the circuitry used to achieve the power factor correction generally discussed above is I.C. 20 (FIG. 11B), which is a power factor correction I.C. manufactured by Unitrode and having part number UC3852N. Resistors 92 and 94 (FIG. 11A) are current sensing resistors that power factor correction I.C. 20 uses to sense instantaneous circuit current. Resistors 92 and 94 convert the sensed current into voltage. Resistor 98 and capacitor 100 (FIG. 11B) form a low pass filter through which this sensed voltage is fed to the ISNS line of I.C. 20.

Resistor 102 is a "kick start" resistor that slowly delivers charge to a capacitor 104 during startup. When the voltage across capacitor 104 surpasses I.C. 20's under voltage lockout threshold, I.C. 20 starts circuit operation initially from the reservoir of energy stored in capacitor 104. This energy sustains operation until a secondary winding on inductor 18 can supply power through rectifying diode 108. Capacitor 110 improves the high frequency stability of the voltage supply.

Resistor 112 externally sets one leg of a current mirror inside of I.C. 20. Capacitor 114 is charged with the other leg of this current mirror until it reaches an internal threshold at which time a new switching cycle is begun.

Resistor 116 is an input resistor that sets the loop feedback gain for the power factor correction circuit. Resistor 118 and Capacitor 120 combine to form a low pass filter that sets the frequency response of the feedback loop. Resistors 30A and 30B develop a feedback voltage in response to output current as discussed above with respect to FIG. 5.

The quick turn-off circuit discussed above with respect to FIG. 6 is shown in FIG. 11C as dashed lines 33. This circuit includes transistor 34, diode 38 and resistor 39. I.C. 20's pulsed output is rectified and stored on the gate capacitance of transistor 34. When the interface circuit is turned off, pulses from I.C. 20 cease and the gate voltage of transistor 34 is eroded by leakage current flowing through resistor 39. As the gate voltage of transistor 34 falls below approximately 5 volts, the drain to source resistance of transistor 34 rises sharply, effectively cutting off supply return current and effecting a quick turn off.

Capacitor 35 is an output filter capacitor that smooths the output ripple caused by the switching action of inductor 18, transistor 16 and diode 136. Resistor 138 serves as a leakage path for capacitor 35 when the circuit is turned off.

The zero current switching boost circuit is indicated in FIGS. 11B and 11C with dashed lines 15 and includes inductor 18, transistor 16 and diode 136. Resistor 140 limits peak gate current to transistor 16 to approximately 1 amp. When transistor 16 conducts, current ramps into inductor 18. When transistor 16 is turned off, the stored energy in inductor 18 causes a sudden increase in the anode voltage of diode 136, forcing a continuance of current started by transistor 16. This current is rectified by diode 136 and stored by capacitor 35 to be used by the output.

Diodes 144, 146 and 148, resistors 150 and 152 and transistor 154 form an over voltage protection circuit 155 (FIG. 11C) with respect to the output 157 of the present interface circuit. Diodes 144, 146 and 148 form a Zener regulator with resistor 150. An over voltage condition exists if the output voltage exceeds the combined Zener voltage of diodes 144, 146 and 148 during which the node 151 of resistor 150 and diode 148 will start to rise above ground and drive transistor 154 into the conduction state through resistor 152 and clamped by diode 153 to a maximum of 10 volts. Transistor 154 pulls Vcc of I.C. 20 to ground causing Vcc to drop below I.C. 20's under voltage lockout threshold and ceasing I.C. 20's operation until the over voltage condition is rectified and a restart can be made. Hysteresis is provided by I.C. 20's startup threshold of 17 volts and it's under voltage threshold of 12 volts.

Figure 12:
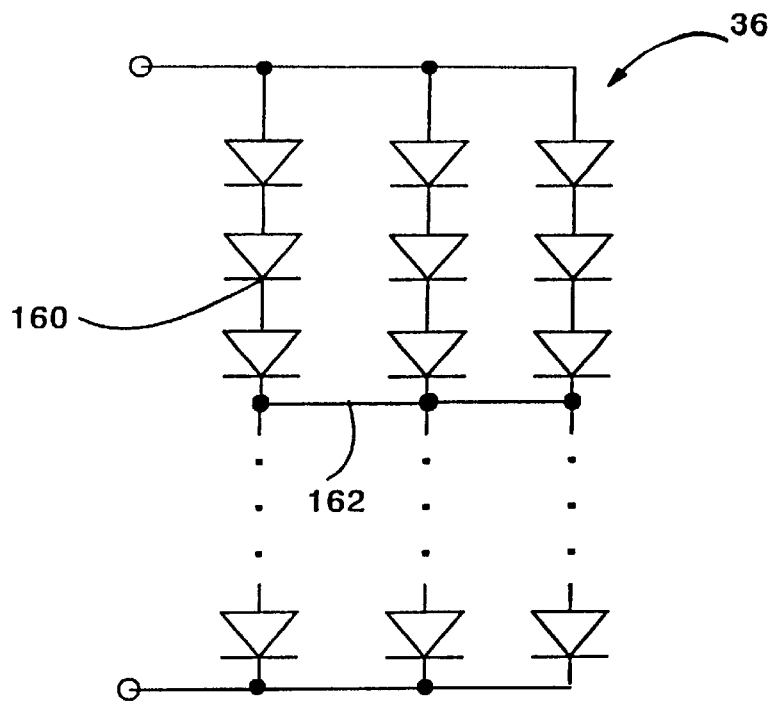
FIG. 12 shows the LED circuit connection arrangement used in larger diameter traffic signals.

The large number of LED's used in a traffic signal allows the LED arrays constituting the load to be arranged in many different configurations of series and/or parallel circuits. This, in turn, allows almost limitless voltage current combinations for a given wattage. Referring now to FIG. 12, it has been found that dividing the LED signal load 36 into three strings of 100 LEDs each in larger diameter traffic signal (e.g., 12 inches) is desirable. This LED arrangement can accommodate the high voltage output of the boost converter 15 (FIG. 11B). Using three strings of LEDs with 30 substring connections also results in only a 3.3% reduction in light output in the case of an individual LED failure. The first few LEDs 160 and the first substring connection 162 for this arrangement are shown in FIG. 12.

Figure 13:
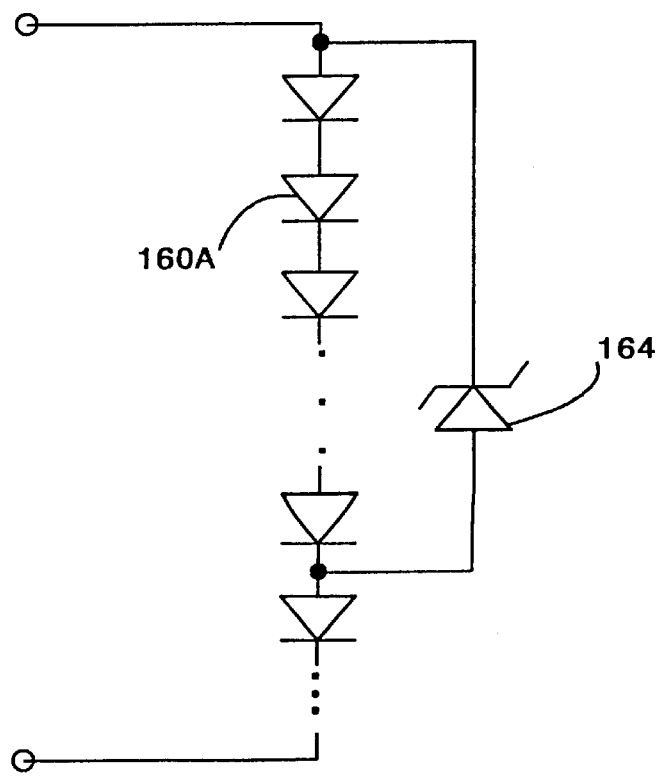
FIG. 13 shows the LED circuit connection arrangement used in smaller diameter traffic signals.

For a smaller diameter traffic signal (e.g., 8 inches), it has been found desirable to arrange the LEDs' in a single string of 150 LEDs to realize a high enough voltage for the boost converter. This arrangement necessitates reverse biased zener diodes 164 to be placed in parallel with every ten LED's to prevent a loss of more than 6.6% total light output in case of an LED failure. In the event an LED should fail open, the voltage would rise high enough to bring the zener 164 into conduction while maintaining current regulation, completing the string as a whole. The first few LEDs 160A and the first zener diode bridge 164 for this arrangement are shown in FIG. 13.

Referring again to FIGS. 11A–11C, another concern with using LEDs in traffic signals is damage to the LEDs due to voltage surges on the incoming line. Surge suppression is accomplished in the present invention with line fuse 72 and a Metal Oxide Varistor ("MOV") 172. The MOV 172 can react to over voltage situations in a few nanoseconds to absorb an energy spike of up to 42 joules. If the over voltage situation lasts for very long, fuse 72 will open. Thus, in the case of short term spikes, MOV 172 acts as a clamp to protect the remaining circuitry. If this spike is of sufficient duration, fuse 72 will open before MOV 172 reaches its maximum energy dissipation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A circuit interfacing between a traffic signal's load switch and conflict monitor and a plurality of light emitting diodes (LEDs) replacing at least one incandescent signal lamp of said traffic signal, said interface circuit being connected to an input voltage and an input current from said load switch, said interface circuit comprising:

a regulated current source for driving said LEDs with a regulated load current so as to control said LEDs' light intensity, said current source providing a power factor of substantially unity by switching said input current so that said input current has an envelope that is substantially the same as said input voltage, said current source being regulated by a feedback signal derived from said load current flowing through said LEDs'; and a sensing circuit for simulating an open filament condition to said conflict monitor when said input voltage is at a predetermined voltage level and said load current drops by at least a predetermined amount.

2. An interface circuit as recited in claim 1 further comprising a switching circuit for sensing said input current's level, said switching circuit being on to short circuit said input current to indicate signal turn off to said conflict monitor when said input current is below a first predetermined current level, and turning off to indicate signal turn on to said conflict monitor when said input current rises above said first predetermined current level.

3. An interface circuit as recited in claim 2 further comprising a circuit for reducing said load current flowing through said LEDs to a range for visible turn-off of said LEDs, said load current reducing circuit including a rectifier for rectifying at least a portion of a current for driving said current reducing circuit on and off.

4. An interface circuit as recited in claim 3 wherein said rectified portion of said driving current acts as a logic indicator for driving said load current reducing circuit on and off.

5. An interface circuit as recited in claim 3 further comprising a surge suppression circuit comprising a varistor for absorbing incoming energy spikes and an in-line fuse which opens when an over voltage condition from said incoming energy spikes lasts for a predetermined amount of time.

6. An interface circuit as recited in claim 1 wherein said current source includes a zero current switched boost converter for said power factor.

7. An interface circuit as recited in claim 6 wherein said zero current switched boost converter switches an inductor to achieve said power factor.

8. An interface circuit as recited in claim 7 wherein said switching boost converter achieves a power factor of substantially unity.

9. An interface circuit as recited in claim 1 wherein said feedback signal to said current source is derived from a voltage developed across a current sense resistor through which said load current flows.

10. An interface circuit as recited in claim 1 wherein said simulating circuit simulates said open filament condition to said conflict monitor when said load current drops by at least 50% for at least several seconds.

11. An interface circuit as recited in claim 1 wherein said sensing circuit comprises:
   a fuse which when opened indicates to said conflict monitor an existence of a failed light signal;
   a second sensing circuit for sensing said input voltage's level and said load current's level; and
   a latching circuit connected between said second sensing circuit and said fuse which latches and thereby opens said fuse when said load current drops by said at least a predetermined amount to thereby indicate to the conflict monitor said existence of a failed light signal.

12. An interface circuit as recited in claim 2 wherein said LEDs are arranged in multiple strings connected in parallel through multiple substring connections between groups of said LEDs to minimize light reduction in case of LED failure.

13. An interface circuit as recited in claim 2 wherein said LEDs are arranged in a single string with reverse biased zener diodes connected in parallel with groups of said LEDs to minimize light reduction in case of LED failure.

14. A traffic signal comprising:
   at least one load switch circuit for providing an input voltage and an input current to at least one incandescent signal lamp;
   at least one conflict monitor designed for verifying that said at least one incandescent signal lamp and at least one other incandescent signal lamp are not on at the same time;
   a plurality of light emitting diodes (LEDs) replacing said at least one incandescent signal lamp of said traffic signal; and
   a circuit for interfacing between said at least one load switch circuit, said at least one conflict monitor and said plurality of light emitting diodes, said interface circuit receiving said input voltage and said input current, said interface circuit comprising:
      a regulated current source for driving said LEDs with a regulated load current so as to control said LEDs' light intensity, said current source providing a power factor near unity by switching said input current so that said input current has an envelope that is substantially the same as said input voltage, said current source being regulated by a feedback signal derived from said load current flowing through said LEDs'; and
      a circuit for simulating an open filament condition to said conflict monitor when said input voltage is at a predetermined voltage level and said load current drops by at least a predetermined amount.

15. A traffic signal as recited in claim 14 wherein said interfacing circuit further comprises a first switching circuit for sensing said input current's level, said first switching circuit being on to short circuit said input current to indicate a signal light turn off to said conflict monitor when said input current is below a first predetermined current level, and turning off to indicate said signal light turn on to said conflict monitor when said input current rises above said first predetermined current level, said input current being inversely proportional to said load switch circuit's impedance.

16. A traffic signal as recited in claim 15 wherein said interface circuit further comprises a second switching circuit for reducing said load current flowing through said LEDs to a range for visible turn-off of said LEDs, said second switching circuit including a rectifier for rectifying at least a portion of a current for driving said second switching circuit on and off.

17. A traffic signal as recited in claim 16 wherein said rectified portion of said driving current acts as a logic indicator for driving said second switching circuit on and off.

18. A traffic signal as recited in claim 15 wherein said simulating circuit simulates said open filament condition to said conflict monitor when said load current drops by at least 50% for at least several seconds.

19. A traffic signal as recited in claim 15 further comprising a surge suppression circuit comprising a varistor for absorbing incoming energy spikes and an in-line fuse which opens when an over voltage condition from said incoming energy spikes lasts for a predetermined amount of time.

20. A traffic signal as recited in claim 15 wherein the plurality of LEDs are arranged in multiple strings of LEDs with multiple substring connections to minimize light reduction in case of LED failure.

21. A traffic signal as recited in claim 15 wherein the plurality of LEDs are arranged in a single string of multiple LEDs with reverse biased zener diodes connected in parallel with a plurality of LEDs to minimize light reduction in case of LED failure.

22. A traffic signal as recited in claim 14 wherein said regulated current source includes a zero current switched boost converter for achieving said power factor.

23. A traffic signal as recited in claim 22 wherein said zero current switched boost converter switches an inductor to achieve said power factor.

24. A traffic signal as recited in claim 22 wherein said switching boost converter provides a power factor of substantially unity.

25. A traffic signal as recited in claim 14 wherein said feedback signal to said current source is derived from a voltage developed across a return line current sense resistor.

26. A traffic signal as recited in claim 14 wherein said simulating circuit comprises:
   a fuse which when opened indicates to said conflict monitor an existence of a failed light signal;
   a sensing circuit for sensing said input voltage's level and said load current's level; and
   a latching circuit connected between said input voltage and load current sensing circuit and said fuse which latches and thereby opens said fuse when said load current drops by said at least a predetermined amount to thereby indicate to said conflict monitor said existence of a failed light signal, said indication being analogous to a burned out incandescent lamp.

27. A circuit interfacing between a traffic signal's load switch and conflict monitor and a plurality of light emitting diodes (LEDs) replacing at least one incandescent signal lamp of said traffic signal, said interface circuit comprising:
   means for driving said LEDs with a power factor corrected current, said LED driving means providing said power factor corrected current by switching an input current so that said input current has an envelope that is substantially the same as an input voltage, said power factor corrected current being regulated by a feedback signal derived from said power factor corrected current flowing through said LEDs so as to control said LEDs' light intensity; and
   means for simulating an open filament condition to said conflict monitor when said input voltage is at a predetermined voltage level and said regulated power factor corrected current drops by at least a predetermined amount.

28. An interface circuit as recited in claim 27 further comprising means for sensing said input current's level, said sensing means short circuiting said input current to indicate signal turn off to said conflict monitor when said input current is below a first predetermined current level, said sensing means turning off to indicate signal turn on to said control circuitry when said input current rises above said first predetermined current level.

29. An interface circuit as recited in claim 28 further comprising means for reducing current flowing through said LEDs to a range for visible turn-off of said LEDs, said current flow reducing means including means for rectifying at least a portion of a current for driving said current flow reducing means on and off.

30. An interface circuit as recited in claim 29 wherein said rectified portion of said driving current acts as a logic indicator for driving said current flow reducing means on and off.

31. An interface circuit as recited in claim 28 wherein said LEDs are arranged in multiple strings connected in parallel through multiple substring connections between groups of said LEDs to minimize light reduction in case of LED failure.

32. An interface circuit as recited in claim 28 wherein said LEDs are arranged in a single string with reverse biased zener means connected in parallel with groups of said LEDs to minimize light reduction in case of LED failure.

33. An interface circuit as recited in claim 28 further comprising means for absorbing incoming energy spikes and means for opening said interface circuit when an over voltage condition from said incoming energy spikes last for at least a predetermined amount of time.

34. An interface circuit as recited in claim 27 wherein said LED driving means includes means for switching said input current that is a zero current switched boost converter for providing power factor correction.

35. An interface circuit as recited in claim 34 wherein said zero current switched boost converter switches an inductor to provide said power factor correction.

36. An interface circuit as recited in claim 34, wherein said zero current switched boost converter achieves a power factor of substantially unity.

37. An interface circuit as recited in claim 27 wherein said feedback signal is derived from a voltage developed across a current sensing means in a feedback loop.

38. An interface circuit as recited in claim 27 wherein said simulating means simulates an open filament condition to said conflict monitor when said current flowing through said LEDs drops by at least 50% for a predetermined amount of time.

39. An interface circuit as recited in claim 38 wherein said predetermined amount of time is at least several seconds.

40. An interface circuit as recited in claim 27 wherein said simulating means comprises:

means for opening said interface circuit to indicate to said conflict monitor an existence of a failed light signal;

means for sensing said input voltage's level and said regulated power factor corrected current's level; and means connected between said sensing means and said circuit opening means for latching to thereby open said circuit opening means when said regulated power factor corrected current drops by said at least a predetermined amount to thereby indicate to said conflict monitor said existence of a failed light signal.

* * * * *